United States Patent
Hill

(10) Patent No.: US 7,011,292 B1
(45) Date of Patent: Mar. 14, 2006

(54) BI-LEAVED VALVE APPARATUS

(75) Inventor: David J. Hill, Racine, WI (US)

(73) Assignee: Spee-Dee Packaging Machinery, Inc., Sturtevant, WI (US)

(*) Notice: Subject to any disclaimer, the term of this patent is extended or adjusted under 35 U.S.C. 154(b) by 74 days.

(21) Appl. No.: 10/786,378

(22) Filed: Feb. 25, 2004

Related U.S. Application Data

(60) Provisional application No. 60/450,018, filed on Feb. 25, 2003.

(51) Int. Cl.
*F16K 3/00* (2006.01)

(52) U.S. Cl. .................. 251/212; 251/304; 137/601.11

(58) Field of Classification Search ............... 251/212, 251/213, 251, 252, 257, 299; 137/601.11, 137/601.09

See application file for complete search history.

(56) References Cited

U.S. PATENT DOCUMENTS

| | | | | | |
|---|---|---|---|---|---|
| 3,074,427 | A | * | 1/1963 | Wheeler, Jr. ............. | 137/512.1 |
| 3,559,679 | A | * | 2/1971 | Smirra ..................... | 137/554 |
| 3,779,511 | A | * | 12/1973 | Wenglar ................... | 251/306 |
| RE28,492 | E | * | 7/1975 | Hedrick et al. ............ | 137/316 |
| 4,076,035 | A | * | 2/1978 | Frisch ..................... | 137/601.11 |
| 4,658,857 | A | * | 4/1987 | Ayres, Jr. ................. | 137/601.11 |
| 4,880,150 | A | * | 11/1989 | Navin et al. .............. | 222/346 |
| 5,246,032 | A | * | 9/1993 | Muddiman ............... | 137/512.1 |
| 5,655,692 | A | * | 8/1997 | Navin et al. .............. | 222/413 |
| 5,711,343 | A | * | 1/1998 | Beckett ..................... | 137/512.1 |
| 6,012,483 | A | * | 1/2000 | Beddies .................... | 137/512.1 |
| 6,612,347 | B1 | * | 9/2003 | Hill ............................ | 141/83 |

OTHER PUBLICATIONS

Author Name Redacted, Valve Drawings, Undated, 2 pages.
Auger Manufacturing Specialists brochure—2 pages—undated.
Spee-Dee Packaging Machinery, Inc. brochure—6 pages—undated.
Robert Bosch GmbH "Usage and mounting of auger filler FVS on the package makers PMC, PKR, PKD and on bag form fill and seal machines" —2pages—undated.
Mateer brochure—1page—undated.
AMS Filling Systems, Inc. brochure—1 page—undated.
Auger Manufacturing Specialists brochure—2 pages—undated.
per-fil Industries brochure—2 pages—undated.
Auger Manufacturing Specialists Dual Flapper Cut-Off product—8 photographs—undated.
Spee-Dee packaging Machinery, Inc. Cut-Off product—6 photographs—undated.

* cited by examiner

*Primary Examiner*—Justine R. Yu
*Assistant Examiner*—Andrew J. Rost
(74) *Attorney, Agent, or Firm*—Jansson, Shupe, Munger & Antaramian, Ltd.

(57) ABSTRACT

Bi-leaved valve apparatus for controlling bulk material flow from a bulk material metering apparatus. A bi-leaved valve apparatus comprises a cylindrical flow tube defining an axial material passageway, an outlet and a flow tube actuation surface. A valve support is mounted about the flow tube adjacent the flow tube outlet such that the valve support and flow tube are relatively rotatable. A pair of leaves are attached to the valve support and are sized to seal the flow tube outlet. The leaves are movable between open and closed orientations and have a valve actuation surface adjacent the flow tube actuation surface. An actuator causes relative rotational movement of the flow tube and valve support such that rotation to a first relative position causes the flow tube and valve actuation surfaces to open the leaves and rotation to a further relative position causes the leaves to close. The valve apparatus may be used with bulk material metering machines such as vertical form/fill/seal packaging machines.

35 Claims, 8 Drawing Sheets

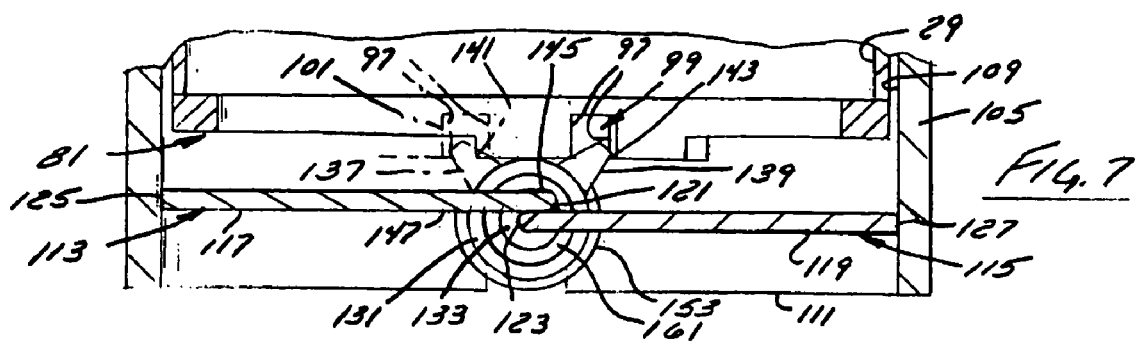
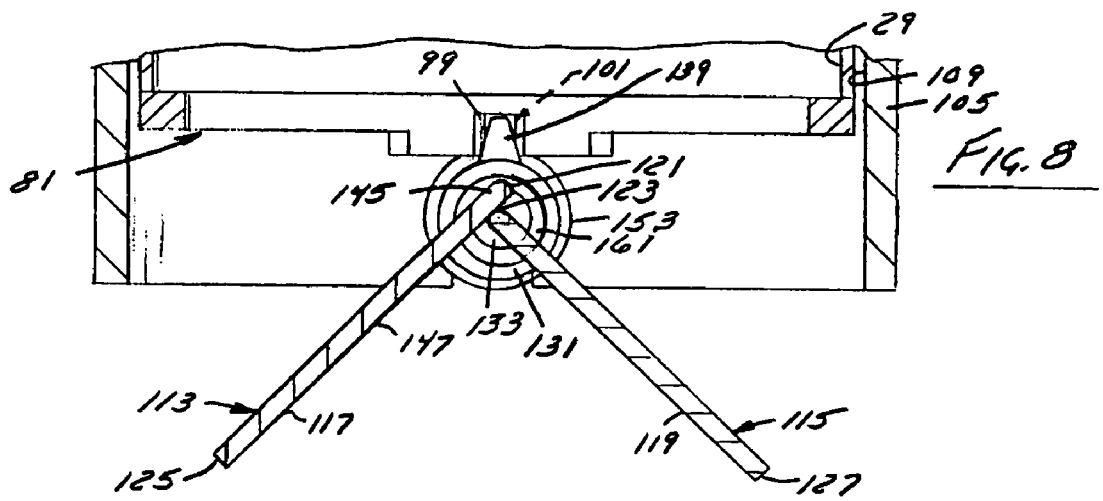
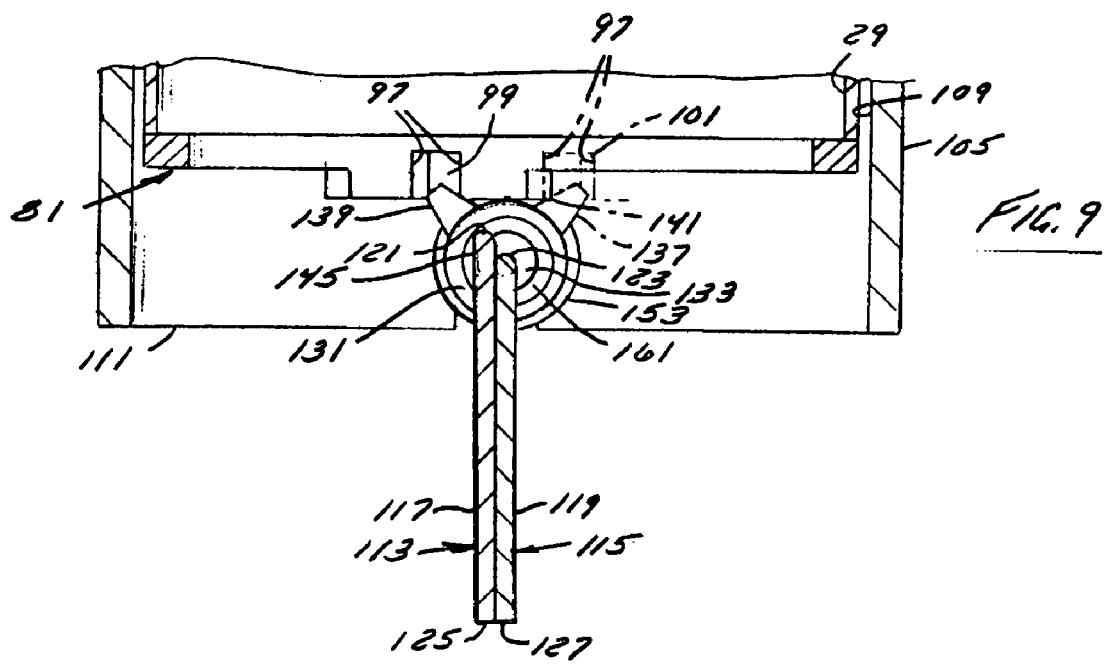

BI-LEAVED VALVE APPARATUS

RELATED APPLICATION

This application claims the benefit of U.S. Provisional Patent Application Ser. No. 60/450,018 filed Feb. 25, 2003, the entire contents of which are incorporated herein by reference.

FIELD OF THE INVENTION

This invention is related generally to controls and, more specifically, to valves used to control bulk material flow.

BACKGROUND OF THE INVENTION

Various methods have been employed in the prior art to disperse and restrict the flow of liquids and solids. "Butterfly" type valves are known including those of the following U.S. Pat. No. 5,246,032 to Muddiman, U.S. Pat. No. 4,076,035 to Frisch, U.S. Pat. No. 3,559,679 to Smirra, U.S. Pat. No. 6,012,483 to Beddies and U.S. Pat. No. 5,711,343 to Beckett. All of these patents teach flow restriction of matter in manners which are different from the present invention.

Specifically related to particulate food matter are a number of devices implemented in dispensing bulk material. Vertical form/fill/seal ("VFFS") machinery is one of the most efficient manners to package bulk material into individual flexible packages, such as cake mix bags.

In a VFFS machine, bulk material (such as powdered cake mix) is typically directed from a feed hopper, through a flow tube and flow tube outlet and into a package. A rotatable auger may be located in the flow tube to urge the bulk material toward the outlet.

Typical VFFS machinery includes the use of heat-sealed film formed into bag-type packages used to contain the bulk material. The film is provided in the form of a web wound on a supply roll. The web is unrolled from the supply roll and passes over rollers which control web tension and re-direct the web into a generally vertical orientation. The web is wrapped over a vertical hollow cylindrical mandrel called a forming tube. The forming tube is located over, and concentric with, the flow tube. A set of horizontal jaws closes each filled package transversely performing three packaging functions nearly simultaneously: (1) the upper seal of a filled package is heat sealed; (2) the lower seal of the empty upper package (i.e., the next sequential package) is heat sealed; and (3) the lower filled and sealed package is separated from the web as a discrete package by a transverse knife which cuts between the two seals. The bulk material product is discharged from the filler and into the open upper end of the package just above the transverse sealing jaws. The jaws open and the filled package is advanced (lowered) so that what was the package above the jaws becomes the package below the jaws. The cycle repeats.

One problem facing the operator of the bulk-material metering machine is to control the flow of the bulk material from the bulk-material metering machine and into the package. Complicating this problem is the fact that many bulk material metering machines, such as VFFS machines, are designed to perform in excess of 100 dispense cycles per minute. If provided, the rotating auger urges the bulk material through the flow tube. The metering or portioning of the bulk material occurs as a result of starting and stopping the auger. Depending on the flow characteristics of the material being filled, the material may not stop flowing when the auger stops turning, resulting in uncontrolled discharge of the bulk material.

One undesirable manifestation of this uncontrolled bulk-material flow is a condition referred to as bulk material "drip." Drip can occur, for example, when loading powdered cake mix into a package utilizing a bulk-material metering machine. The continual flow, or drip, of bulk material is a problem because the falling material can interfere with the package sealing process by falling onto the package portion being sealed, thereby possibly interfering with seal formation. Formation of an incomplete seal is undesirable because the packaged product can become spoiled and rendered unsalable.

A number of strategies have been proposed to control bulk material flow and to limit or stop the occurrence of bulk material "drip." Each of these strategies has certain disadvantages.

One strategy includes the use of a "cut-off" device to positively stop the flow of bulk material from the flow tube outlet. A number of such devices are known. One such device is a slide gate powder cut-off device used with VFFS machinery and sold by Mateer-Burt, Inc. This gate device is located at least partially between the flow tube and forming tube. The forming tube must have a diameter large enough to accommodate the gate assembly.

One possible concern with this device is that its use of a sliding gate may cause cleanliness problems associated with the use of sliding joints in a contaminated area.

A more serious disadvantage is that the slide gate makes the bulk-metering machine less efficient. This decrease in efficiency results from the fact that the machine throughput is relatively decreased given the larger packaging volumes required by the proportionally larger forming tube required to accommodate the gate assembly. Generally, it is most desirable to size the flow tube as closely as possible to the forming tube so that a smaller package can be used and so that less work is required to fill the package unit volume. Put another way, use of an auger which is proportionally larger relative to the package to be filled makes the filling process more efficient and boosts throughput because relatively fewer turns of the auger are required to fill the package. The bulk of the slide gate and the larger size of the forming tube required to accommodate the slide gate causes the bulk-material metering machine including such a cut-off device to be relatively less efficient.

Another known apparatus is a horizontal gate, or drip tray, sold by All Fill, Inc. This gate device utilizes a tray located to the side of the material outlet and which is extended under the outlet from the side location. This device is not optimal for use with VFFS-type bulk material metering machinery because, once again, a larger forming tube is required to accommodate the side-mounted tray.

Yet another known cut-off device, and a device most commonly used in VFFS machinery, is a double flapper cut-off assembly manufactured by Auger Manufacturing Specialists, Inc. However, this device is not optimal because the rectangular shape of the double flapper and the cylindrical shape of the bulk material flow tube once again require a larger forming tube, making the machine relatively less efficient and wasting valuable space.

In an effort to overcome this problem, the size of the parts comprising the hinges and flapper mechanism have been reduced thereby permitting use of a smaller forming tube. However, this is disadvantageous because using less robust parts can increase the likelihood of flapper assembly failure, reducing machine service life and decreasing machine efficiency. More robust double flapper assemblies are made at the expense of flow area, ultimately reducing efficiency and product output.

Another strategy used to combat bulk material "drip" is to slow the rate at which the bulk-material metering machine operates. This can be accomplished by providing a greater time duration between termination of auger rotation and sealing of the package. Since most of the drip occurs immediately after termination of auger rotation, delaying initiation of the sealing operation should minimize or avoid drip-based interference with the sealing operation. Unfortunately, this strategy greatly reduces bulk-material metering machine efficiency and is contrary to the objective of increasing throughput.

Efficient operation of the bulk metering machinery is of utmost importance to the manufacturing facility operator. The operator must continuously seek to achieve the same or greater amounts of packaging throughput with the least number of bulk material filling machines. Filling lines utilizing machines, such as VFFS machines, come at great expense, costing typically around $100,000. Manufacturing facility floor space is valuable and must be utilized in the most efficient manner possible. Extending the duration of the dispense cycle is simply not an acceptable strategy for filling lines with potentially high throughput, for instance 7000 packages per hour.

It would be an improvement in the art to provide an improved apparatus for controlling the flow of bulk material discharged from a bulk-material metering machine, which would facilitate efficient, improved operation of the bulk-material metering machine and which would provide for improved packaging of the bulk material metered out from the machine.

OBJECTS OF THE INVENTION

It is an object of the invention to provide an improved bi-leaved valve apparatus overcoming some of the problems and shortcomings of the prior art, including those referred to above.

A further object of the invention is to provide an improved bi-leaved valve apparatus which provides improved control over bulk material flow.

Another object of the invention is to provide an improved bi-leaved valve apparatus which is robust and easy to manufacture and use.

One additional object of the invention is to provide an improved bi-leaved valve apparatus which operates reliably over repeated operational cycles.

It is also an object of the invention to provide an improved bi-leaved valve apparatus which facilitates more efficient bulk material flow.

An object of the invention is to provide an improved bi-leaved valve apparatus which, when used with packaging apparatus, facilitates efficient packaging of bulk material.

Yet another object of the invention is to provide an improved bi-leaved valve apparatus which can operate with different types of bulk-material metering apparatus.

How these and other objects are accomplished will become apparent from the following descriptions and the drawings.

SUMMARY OF THE INVENTION

The general object of the present invention is to provide a matter dispensing apparatus, commonly referred to as a cut-off device, that is an improvement upon the prior art by increasing efficiency and increased rate of accurate dispensation. The novel design of the invention permits the use of a smaller forming tube thereby further permitting the use of a relatively larger flow tube and auger thereby increasing the available volume and rate of flow. The present invention achieves this through providing a bi-leaved valve with coaxial pivots on the end of the leaves, the leaves being actuated by a mechanical coupling. The mechanical coupling may be in the form of a cam, rack and pinion, or friction wheel. The compact size and efficient arrangement of the components permits the operator to use smaller forming tubes, thereby improving machine efficiency.

More specifically, the invention is advantageous for use with food particulate matter dispensing apparatus comprising a conical hopper, feed screw auger, and vertical form/fill/seal machinery ("VFFS").

In general, the invention comprises a bi-leaved valve apparatus. The valve apparatus preferably is utilized in conjunction with a substantially cylindrical flow tube to control the flow of bulk material from the flow tube outlet. The flow tube preferably is of the type having an axial material passageway, an outlet and a flow tube actuation surface. A valve support is mounted about the flow tube adjacent the flow tube outlet. The valve support and flow tube are relatively rotatable. A pair of leaves are attached to the valve support and are sized to seal the flow tube outlet. The leaves are movable between open and closed orientations and have a valve actuation surface adjacent the flow tube actuation surface. An actuator is provided to cause relative rotational movement of the flow tube and valve support such that rotation to a first relative position causes the flow tube and valve actuation surfaces to open the leaves and rotation to a second relative position causes the leaves to close.

In one embodiment, the flow tube actuation surface comprises a pair of notches integral with the flow tube and the valve actuation surface comprises an activating arm projecting from each leaf into a respective notch. Each respective notch and arm coact during relative rotation of the flow tube and valve support to move the leaves between the open and closed positions.

It is most highly preferred that the flow tube is stationary and that the valve support rotates relative to the flow tube. Preferably, the valve support is mounted for bi-directional rotational movement between the positions. Most preferably, the valve support defines a valve support opening having a substantially circular cross section transverse to the axial material passageway. In this embodiment, the leaves are diametrically connected to the valve support across the valve support opening along a common axis.

Preferably, each leaf has a generally "D-shaped" profile including a straight edge and an intersecting arcing edge defining a maximum distance from the straight edge. The leaves form a substantially circular surface across the valve support opening when in the closed position. It is also preferred that the leaves are sized to partially overlap adjacent the straight edges thereby preventing material flow between the leaves. Each leaf most preferably includes a pair of axially-aligned stub shafts journaled with respect to the valve support along the single axis. In an embodiment, one of each pair of axially-aligned stub shafts has a female end journaled directly in the valve support and the other of each pair of axially-aligned stub shafts has a male end journaled in the female end.

The actuator may be any actuator capable of causing relative rotation of the flow tube and valve support. In a preferred embodiment, the actuator comprises an actuator mount and a linear actuator having a body affixed to the actuator mount and an actuator piston. A linkage connects the piston and valve support and movement of the piston rotates the valve support relative to the flow tube. A controller is provided to control operation of the linear actuator. It is most preferred that the actuator is a pneumatic actuator, although solenoids, cams, drive wheels, stepper motors and other types of actuators may be used. It is most preferred that the actuator is a linear actuator providing bi-directional movement to the piston.

The inventive valve apparatus may be used with various bulk-material metering apparatus, including with a VFFS apparatus. The preferred VFFS apparatus comprises a support structure and a feed hopper mounted with respect to the support structure. The substantially cylindrical flow tube is mounted with respect to the support structure and the valve support is mounted about the flow tube adjacent the flow tube outlet such that the valve support and flow tube are rotatable relative to the other. The valve leaves are pivotally connected to the valve support across the flow tube outlet and an actuator causes the relative rotational movement of the flow tube and valve support to open and close the valve leaves. The structure of the most highly preferred forms of the inventive valve apparatus is such that the VFFS machine may be used with a relatively smaller diameter forming tube, thereby increasing VFFS machine efficiency. Packager, sealer and separator systems are associated with the VFFS machine to process the bulk material into separate packages.

Examples of the best mode of the invention will now be described in full detail in connection with the drawings and detailed description which follow.

BRIEF DESCRIPTION OF THE DRAWINGS

FIG. 7 is schematic diagram provided to illustrate operation of an exemplary valve apparatus according to the invention. The schematic diagram generally shows a side elevation view of an actuation surface and assembled leaves in a closed position. To facilitate understanding of the embodiment shown, portions of the valve apparatus have been cut away or are not shown while other portions have been superimposed in the drawing.

FIG. 8 is a further schematic diagram showing the valve apparatus components of FIG. 7, but with the leaves depicted in a partially-open position.

FIG. 9 is a further schematic diagram showing the valve apparatus components of FIGS. 7 and 8, but with the leaves depicted in a fully-open position.

DETAILED DESCRIPTION OF PREFERRED EMBODIMENTS

An exemplary bi-leaved valve apparatus 10, will now be described in conjunction with a bulk-material metering apparatus in the form of a VFFS packaging machine 11 shown in FIGS. 1 and 2. Persons of skill in the art will appreciate that the valve apparatus 10 will have utility with types of bulk-material metering apparatus other than the VFFS packaging machine 11 shown. The preferred embodiments described herein are not intended to be exhaustive or to limit the invention to the precise form disclosed.

Figure 1:
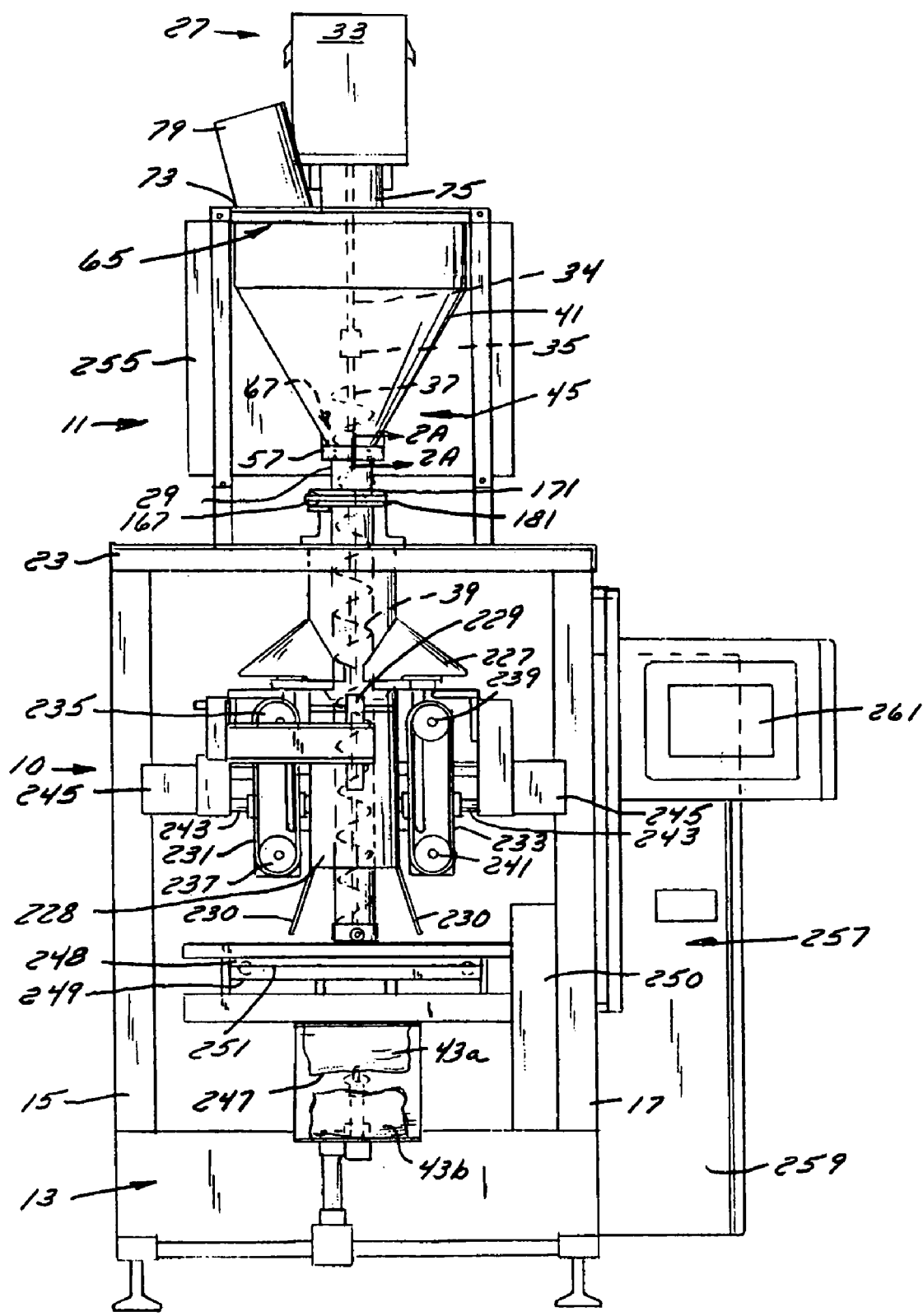
FIG. 1 is a side elevation view of a bulk material metering apparatus including exemplary valve apparatus according to the invention. Certain hidden portions of the structure are shown in dotted line.
Figure 2:
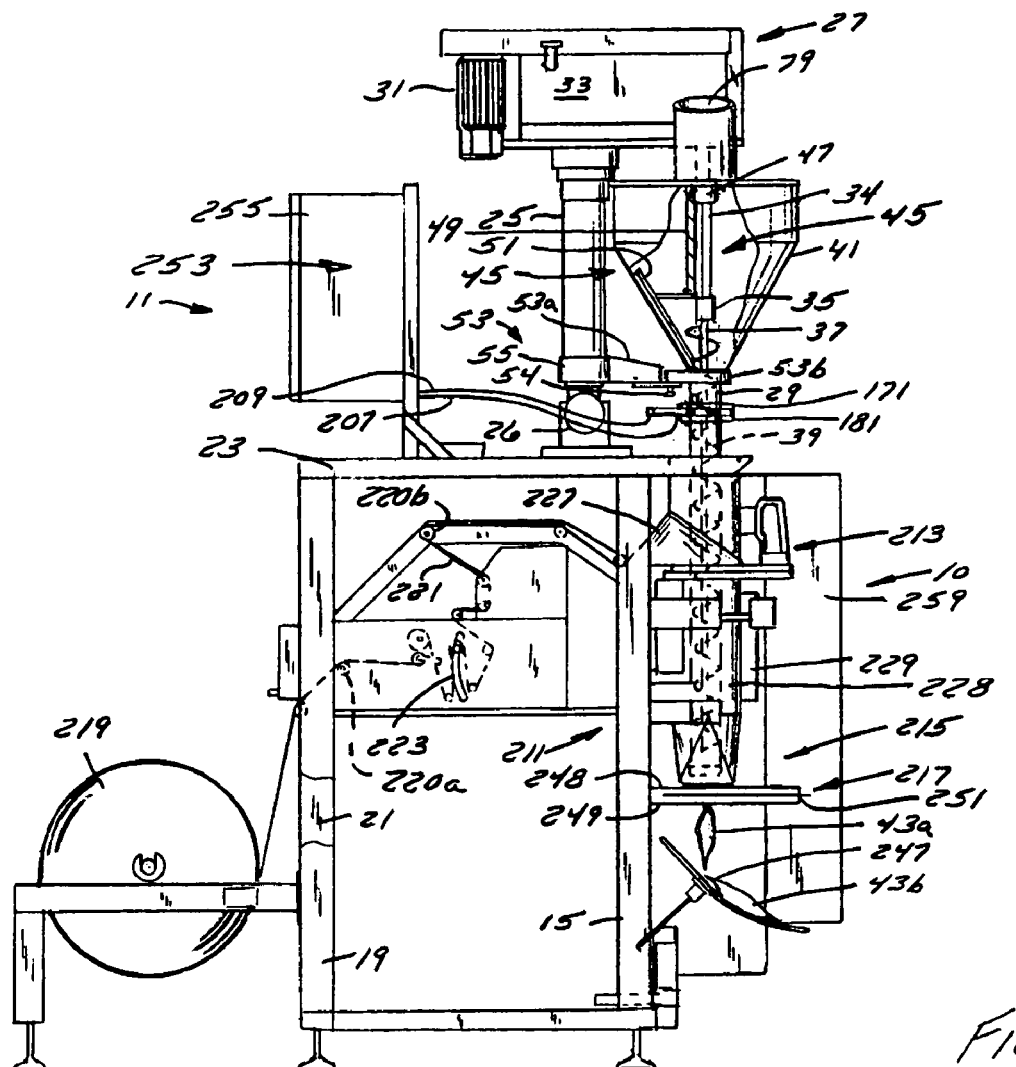
FIG. 2 is a further side elevation view of a bulk material metering apparatus including exemplary valve apparatus according to the invention. Certain hidden portions of the structure are shown in dotted line and other portions are cut away.

Referring then to FIGS. 1 and 2, VFFS packaging machine 11 has an upright, generally rectangular frame 13 with four vertically-oriented support elements 15, 17, 19, 21 supporting the frame about its periphery. Shelf 23 is mounted to the support elements 15, 17, 19, 21. A jacking column 25 mounted to shelf 23 at one end supports drive assembly 27. Jacking column 25 includes a jacking mechanism 26 permitting column 25 to be raised or lowered relative to shelf 23. Providing an adjustable column 25 advantageously permits the operator to adjust the position of the flow tube 29 relative to machine 11 to generally improve the performance of the machine 11.

Drive assembly 27 includes an electric motor 31, a drive housing 33 and an adapter shaft 34 in power-transmission relationship with the motor, for example using pulleys and a belt (not shown) within housing 33. Auger shaft 37 of auger 39 is joined to adapter shaft 34 at coupling 35 such that motor 31 powers auger 39 to rotate urging bulk material in hopper 41 through flow tube 29 and into a package 43 as described in detail below. (In FIGS. 1–2, one package 43 is shown as a newly-formed package 43a and another package 43 is shown as a fully-formed package 43b immediately following separation from the web of packaging material 221.) Preferably, coupling 35 is of a quick-connect design provided to facilitate rapid attachment and removal of auger shaft 37 from the coupling 35. One such coupling 35 is described and illustrated in commonly-owned U.S. Pat. No. 5,655,692, the contents of which are incorporated in their entirety.

Optionally, and as shown only in FIG. 2, drive assembly 27 may power a separate feed hopper agitator 45 provided to facilitate free flow of bulk material within hopper 41. If provided, a separate motor (not shown) and gear mechanism (not shown) in housing 33 power rotational movement of agitator coupling 47 and agitator shaft 49 removably attached thereto. Powering of coupling 47 causes agitator 45 to rotate within hopper 41 such that rotation of agitator blade 51 agitates the bulk material in hopper 41 breaking up any clumped-together bulk material such that the bulk material will flow freely toward the auger 39.

Figure 2A:
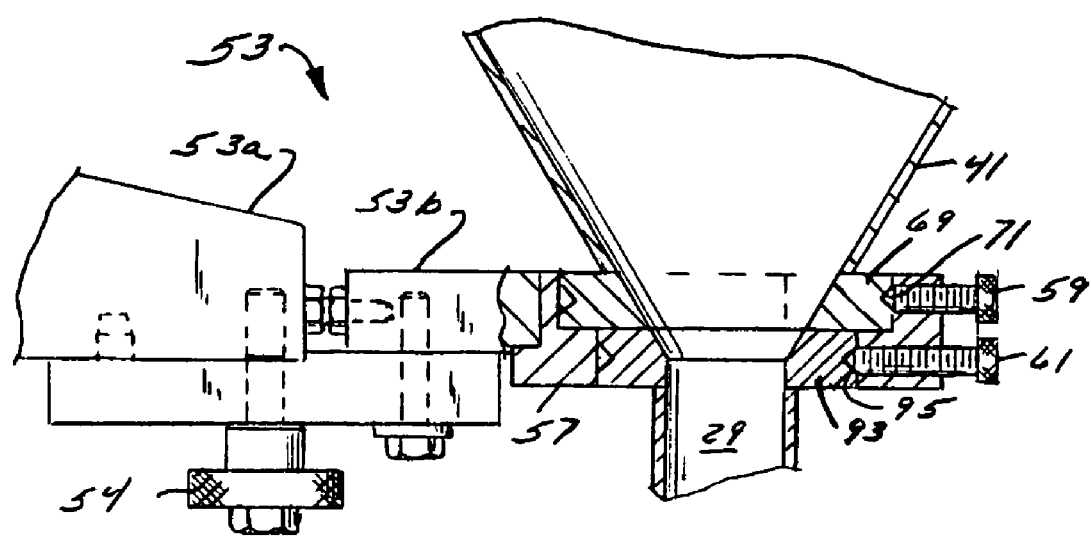
FIG. 2A is an enlarged sectional view of portions of the feed hopper coupling assembly taken along section 2A—2A of FIG. 1.
Figure 3:
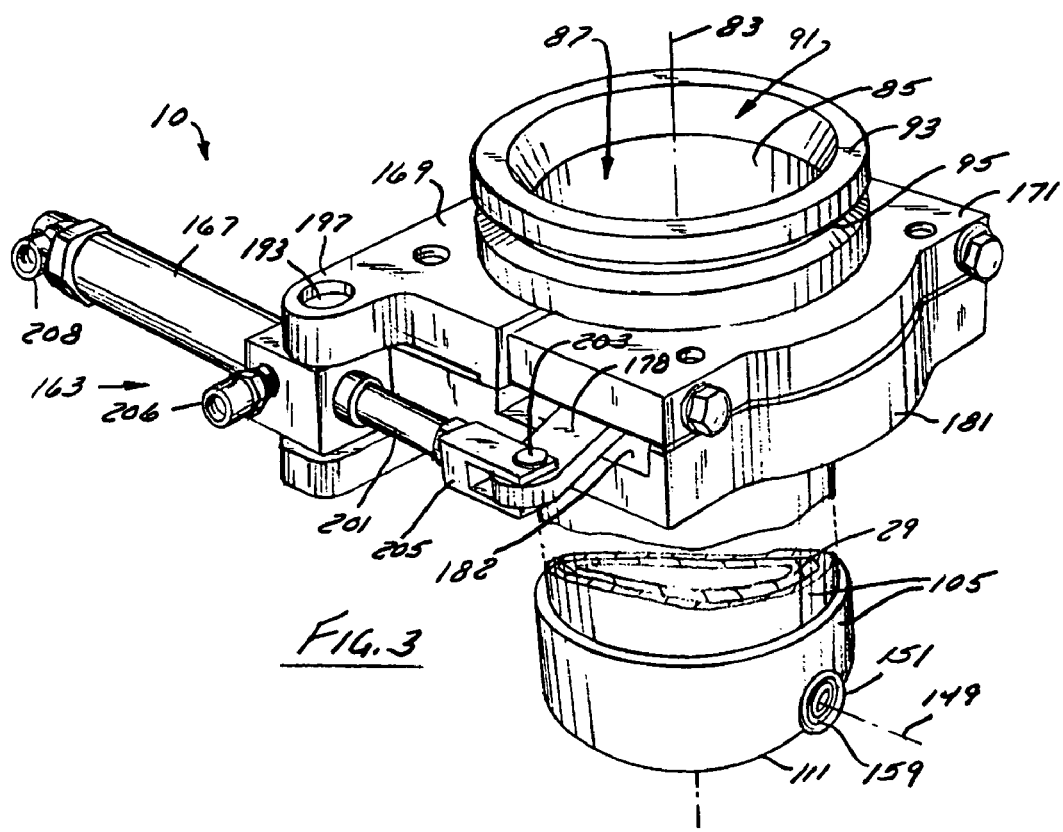
FIG. 3 is a perspective view of an exemplary valve apparatus according to the invention. Portions of the structure shown have been cut away.

Referring to FIGS. 1, 2 and 2A, a feed hopper coupling assembly 53 supports feed hopper 41 and flow tube 29. At one end 53a, feed hopper coupling assembly 53 has a two-piece annular coupling 55 fixed about jacking column 25 by means of bolts (not shown) which join the coupling 55 pieces together in fixed-position relationship about the jacking column 25. This structure permits the operator to raise or lower coupling assembly 53 relative to shelf 23 and jacking column 25 to provide for use of different sizes and shapes of feed hoppers 41 and flow tubes 29 and to provide further opportunity for adjustment of the axial position of the hopper 41 and flow tube 29.

At another end 53b, coupling assembly 53 terminates in an annular support ring 57 to which the feed hopper 41 and flow tube 29 are attached. Support ring 57 has a plurality of hopper set pins 59 threaded therein projecting radially inward and a set of flow tube set pins 61 also threaded therein projecting radially inward and located below the hopper set pins 59. The set pins 59, 61 are provided to secure the hopper 41 and flow tube 29 in fixed-position relationship to support ring 57 as described in more detail below.

Coupling assembly 53 ends 53a and 53b may optionally be detachably joined together by thumb screw 54 threaded through ends 53a and 53b. Removal of thumb screw 54 permits end 53b hopper 41 to be detached while end 53a remains fixed to jacking column 25. Because hopper 41, support ring 57 and end 53b may remain connected, this optional structure facilitates rapid detachment and re-attachment of the hopper 41 so that the hopper may be quickly cleaned at a location remote from machine 11 and returned to operation.

Persons of skill in the art will appreciate that frame 13, shelf 23, jacking column 25, and coupling assembly 53 are fabricated from materials which will support heavy loads and accommodate forces applied during operation of the VFFS machine 11. Use of materials such as aluminum, and #304 or #316 stainless steel are preferred, particularly for applications in the food packaging or pharmaceutical industries.

Referring to FIGS. 1, 2 and 2A, hopper 41 is generally funnel-shaped and has an upper hopper inlet 65 and a lower hopper outlet 67. An annular flange 69 depends from hopper 41 concentric with hopper outlet 67. Flange 69 has an outer circumference sized to mate with and fit within annular support ring 57 and an annular groove 71 formed therein. Hopper set pins 59 mesh with annular groove 71 when tightened securing hopper 41 with respect to hopper coupling assembly 53. This arrangement permits hopper 41 to be easily mounted on, and removed from, VFFS machine 11.

A hopper cover 73 is optionally positioned over hopper inlet 65 to prevent contaminants from coming into contact with bulk material in hopper 41. Hopper cover 73 is preferably secured to drive assembly housing 33 head unit 75 by suitable fasteners, such as bolts (not shown). A bulk-material inlet 79 may be provided in cover 73 to permit bulk-material to be fed into hopper 41 from suitable feed apparatus (not shown) on a continuous basis.

Referring now to FIGS. 1–6, flow tube 29 is provided to direct the flow of bulk material from the feed hopper 41 to a flow-tube outlet 81 so that the bulk material may be loaded in a package 43 as described in detail below. Flow tube 29 is preferably fabricated as a cylinder having an axis 83, an inner wall 85 defining a cylindrically-shaped axial material passageway 87, a cylindrically-shaped outer surface 89, an upper inlet 91 and lower outlet 81. Flow tube 29 may be of any suitable axial length and diameter.

As described above, flow tube 29 is secured to VFFS machine 11 at coupling assembly 53 annular support ring 57. As best shown in FIGS. 2A, 3, 5 and 6, an annular flange 93 is provided in flow tube 29 concentric with flow tube inlet 91. Like hopper flange 69, flow tube flange 93 has an outer circumference sized to mate with and fit into annular support ring 57 and an annular groove 95 formed therein. When flange 93 is fitted into support ring 57, as shown in FIG. 2A, flow tube set pins 61 can be tightened to mesh with annular groove 95 securing flow tube 29 with respect to hopper coupling assembly 53. Flow tube 29 may be mounted in other ways such as by engagement of threads about flange 93 with corresponding threads on support ring 57. Flow tube 29 extends through an unshown opening in shelf 23 as illustrated in FIGS. 1 and 2. This arrangement permits flow tube 29 to be easily mounted on, and removed from, VFFS machine 11. In this example, flow tube 29 is in fixed-position relationship with the VFFS machine 11 and does not rotate.

Referring to FIGS. 5–10, flow tube actuation surface 97 is provided adjacent flow tube outlet 81 for a purpose described in detail below. The preferred actuation surface 97 comprises a pair of notches 99, 101 formed adjacent outlet 81 at the most downstream end of the flow tube 29 relative to the bulk material. The notches 99, 101 are preferably situated at their furthest distance relative to each other on the actuation surface 97.

Figure 5:
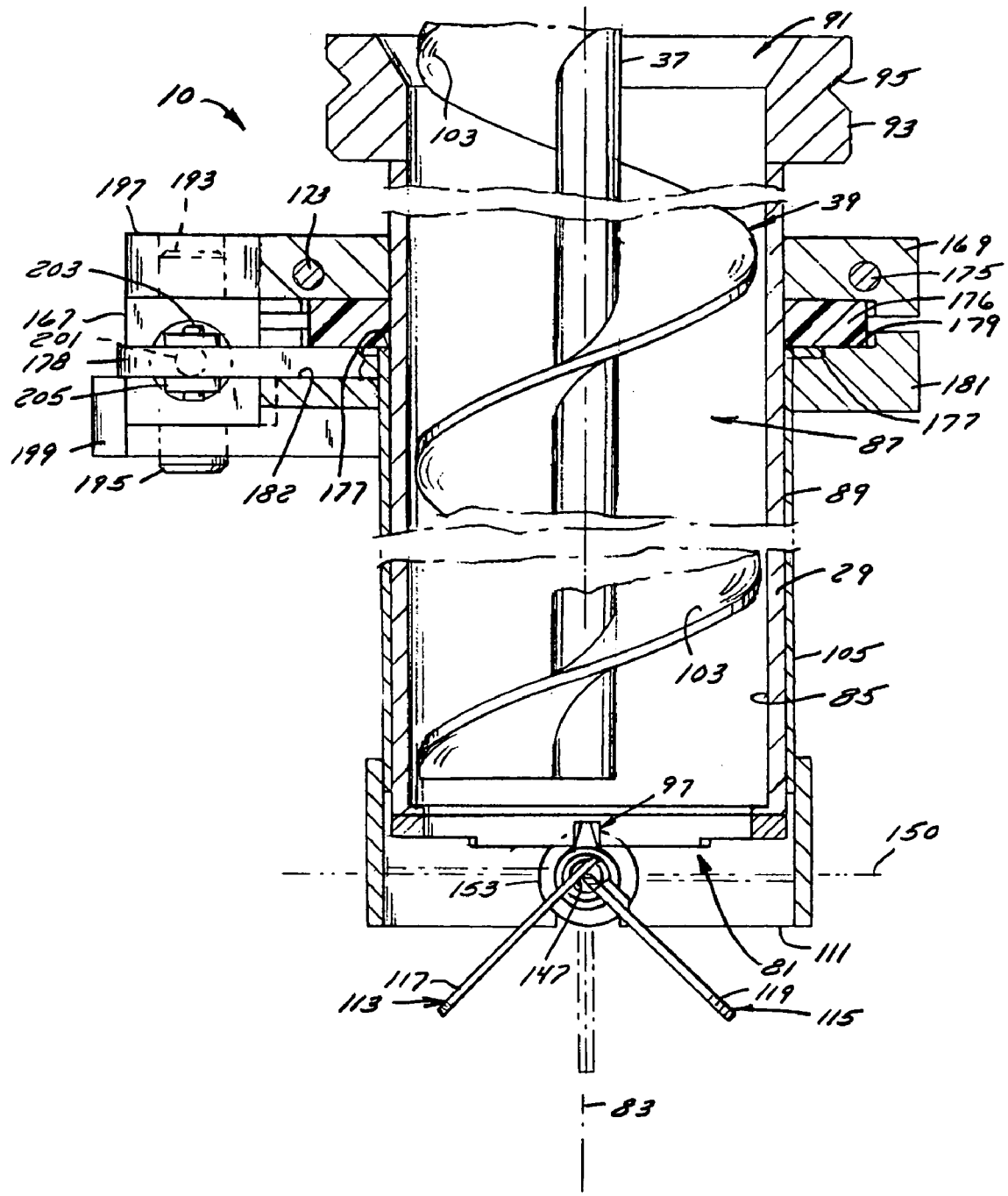
FIG. 5 is a side sectional view of an exemplary valve apparatus according to the invention taken along section 5—5 of FIG. 6. An auger is added to FIG. 5.

When mounted, feed hopper 41 and flow tube 29 are in material-flow relationship because bulk material flows from the hopper 41 through the hopper lower outlet 67 and flow tube inlet 91, into the flow tube material passageway 87 and out of the flow tube through flow tube outlet 81. Auger 39 may be provided to facilitate the flow of bulk material from the hopper 41 through the flow tube 29. As shown in FIGS. 1, 2 and 5, auger 39 extends through hopper 41 and flow tube 29 and includes helical flights 103 which, when rotated, convey the bulk material between the hopper 41 and flow tube 29. Auger 39 is sized for free rotation in material passageway 87 and may be of any suitable length. Auger 39 may be made of any suitable material with #304 or #316 stainless steel being preferred materials.

Flow tube 29 is made of a rigid material, such as metal or plastic. Stainless steel is a preferred material, particularly for use in the food-packaging industry. Inner wall 85 is preferably smooth permitting the bulk material to flow easily through passageway 87. Flow tube 29 need not be mounted in the fully upright position shown in FIGS. 1 and 2 and may be oriented in other generally-vertical orientations provided that bulk-material flow through passageway 87 is adequate for the given application.

Figure 4:
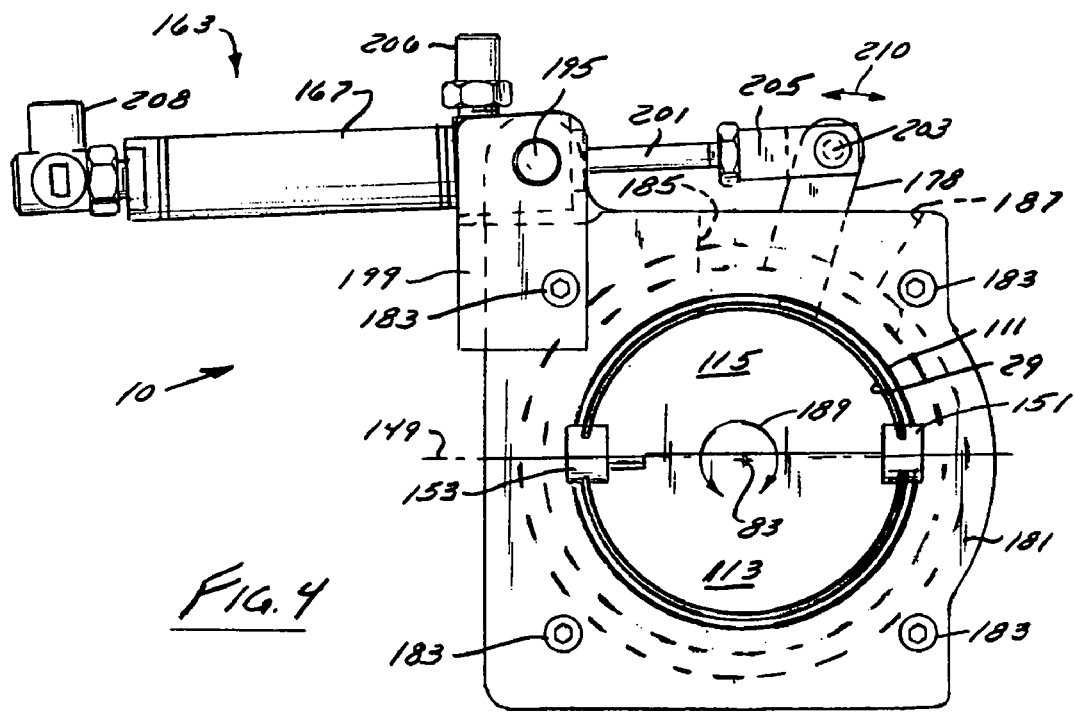
FIG. 4 is a bottom view of an exemplary valve apparatus according to the invention. Certain hidden portions of the structure are shown in dotted line.

Referring now to FIGS. 1–10, a valve support 105 is concentrically mounted around the arcuate outer surface 89 of the flow tube 29. In the preferred embodiment shown, valve support 105 is in the form of a cylindrically-shaped tube positioned about flow tube 29 thereby providing a partial "tube within a tube" arrangement. Valve support 105 has an outer surface 107, an inner surface 109 which rides along flow tube outer surface 89 and an outlet end 111 proximate flow tube outlet 81. In this preferred embodiment, valve support 105 is rotatable relative to flow tube 29, which is fixed. Preferably, valve support end 111 extends beyond flow tube outlet 81 and actuation surface 97 as is well shown in FIGS. 5 and 7–9. End 111 has a substantially circular shape in a section taken transverse to axis 83 as is shown in FIG. 4.

A pair of valve leaves 113, 115 are movably attached to the valve support 105 proximate end 111. Leaves 113, 115 are sized to seal the flow tube outlet 81 to positively stop the flow of bulk material from flow tube 29. As will be described in more detail in connection with FIGS. 5 and 7–9, leaves 113, 115 are movable between (1) an "open" position (FIG. 9) in which the flow tube outlet 81 is open permitting bulk material flow through outlet 81 and (2) a "closed" position (FIG. 7) in which the flow tube outlet 81 is fully obstructed fully stopping flow of bulk material through outlet 81.

Leaves 113, 115 are infinitely positionable between the open and closed positions (FIGS. 5, 7–9). Precise stoppage of bulk material flow through flow tube 29 is desirable because it provides the operator with a greater degree of control over dispense cycle duration and the specific amount of bulk material placed in each package 43 and further prevents undesired bulk material "drip" by stopping the fall of small amounts of bulk material in a way which would interfere with the sealing of a package 43.

Each leaf 113, 115 is comprised of a substantially "D" shaped planar flap 117, 119. The preferred "D" shape includes a straight edge 121, 123 and an intersecting arcing edge 125, 127 defining a maximum distance from the respective straight edge 121, 123. When in the closed position, the leaves 113, 115 form a substantially circular surface across the outlet 81 and valve support outlet end 111 corresponding to the generally circular shape of such outlet end 111.

Each leaf 113, 115 is pivotally secured to valve support 105 by a pair of axially-aligned stub shafts 129, 131, 133, 135 journaled in valve support 105. One of each pair of stub shafts 129, 133 has a male end and the other of each pair of stub shafts 131, 135 has a female end. Each leaf 113, 115 further includes an activating arm 137, 139 with a cam surface 141, 143 positioned in a respective notch 99, 101 for the purpose described below. Cam surfaces 141, 143 serve as a valve actuation surface for the respective leaf 113, 115 in this embodiment. When the valve support 105 is rotated in a first direction of arrow 189, one side of a notch 99 or 101 contacts a corresponding cam surface 141, 143 along a side of corresponding activating arm 137, 139 while rotation of valve support 105 in a second, opposite, direction along arrow 189 causes the other side of notch 99 or 101 to contact corresponding cam surface 141 or 143 on the opposite side of the corresponding activating arm 137, 139. Such coaction moves the leaves 113, 115 between the open and closed positions. FIGS. 7–9 show the activating arms 137, 139 mounted along respective female stub shaft end 131, 135. As shown in the alternative embodiment of FIG. 10, activating arms 137, 139 may extend from male stub shaft ends 129, 131.

Preferably, one of the leaves 113 has a planar flap 117 that includes an extension portion 145 formed by the slightly longer arcing edge 125 of flap 117 (i.e., flap 117 has a slightly greater area than flap 119) so that straight edge 121 of leaf 113 overlaps the other leaf 115 slightly. Thus, in this preferred embodiment, leaf 113 may be referred to as an inner leaf and leaf 115 as an outer leaf due to their relative overlapping relationship across opening 111.

As is well shown in FIGS. 5 and 7–9, a further advantage of this arrangement is that the straight edge 123 of outer leaf 115 may be in continuous contact with inner leaf 113 outer surface 147 as the leaves 113, 115 move toward and away from the open position thereby avoiding any gap between leaves 113, 115 and providing a more complete seal across valve support outlet end 111. This is accomplished by the slightly off center mounting location of flap 117 with respect to stub shafts 129, 131 as is well shown in FIGS. 7–9. Planar flaps 117, 119 are preferably made of a resilient material permitting the leaves to be urged against each other providing a more complete seal across flow tube opening 81.

Figure 6:
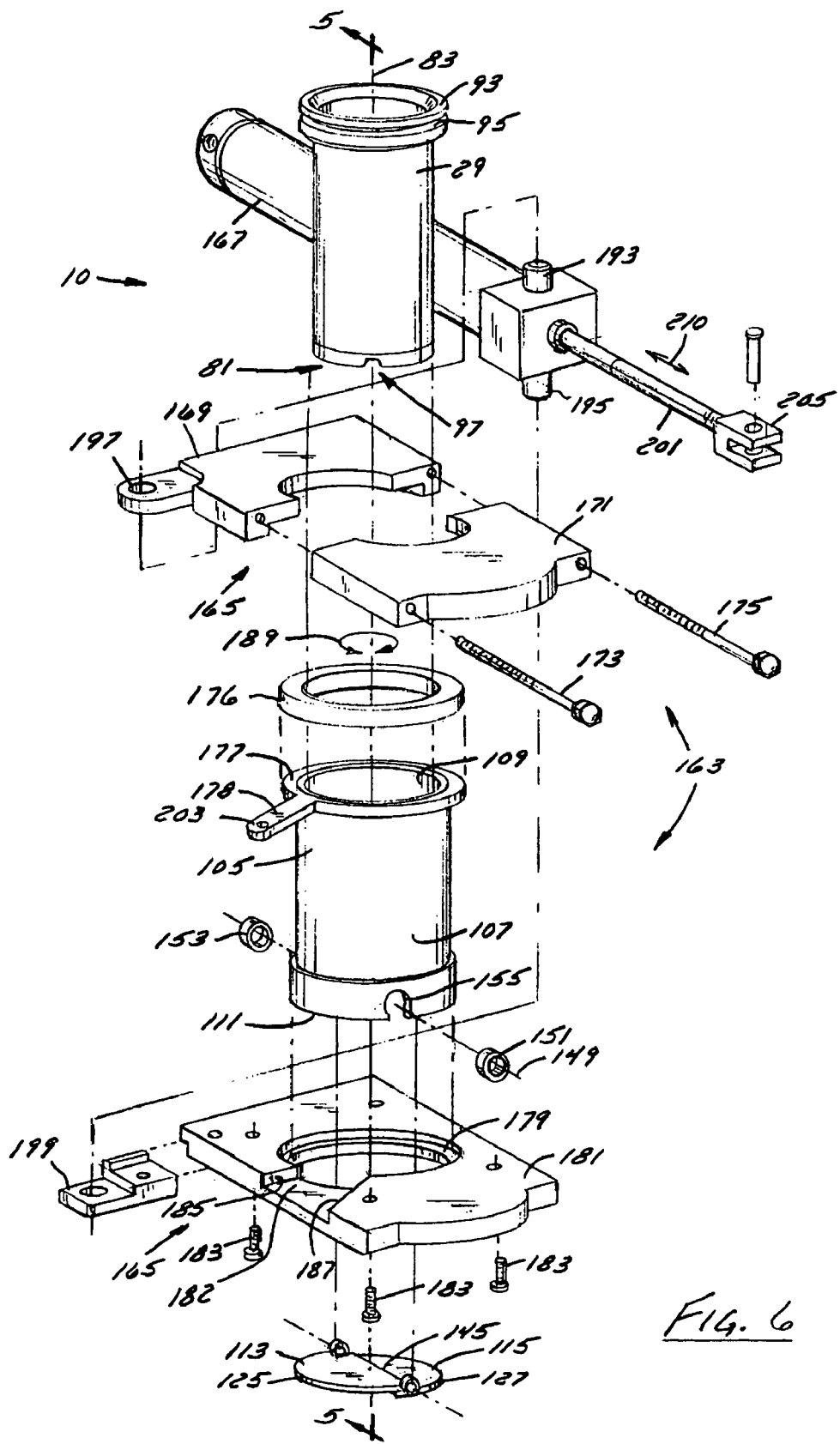
FIG. 6 is an exploded view of an exemplary valve apparatus according to the invention.
Figure 10:
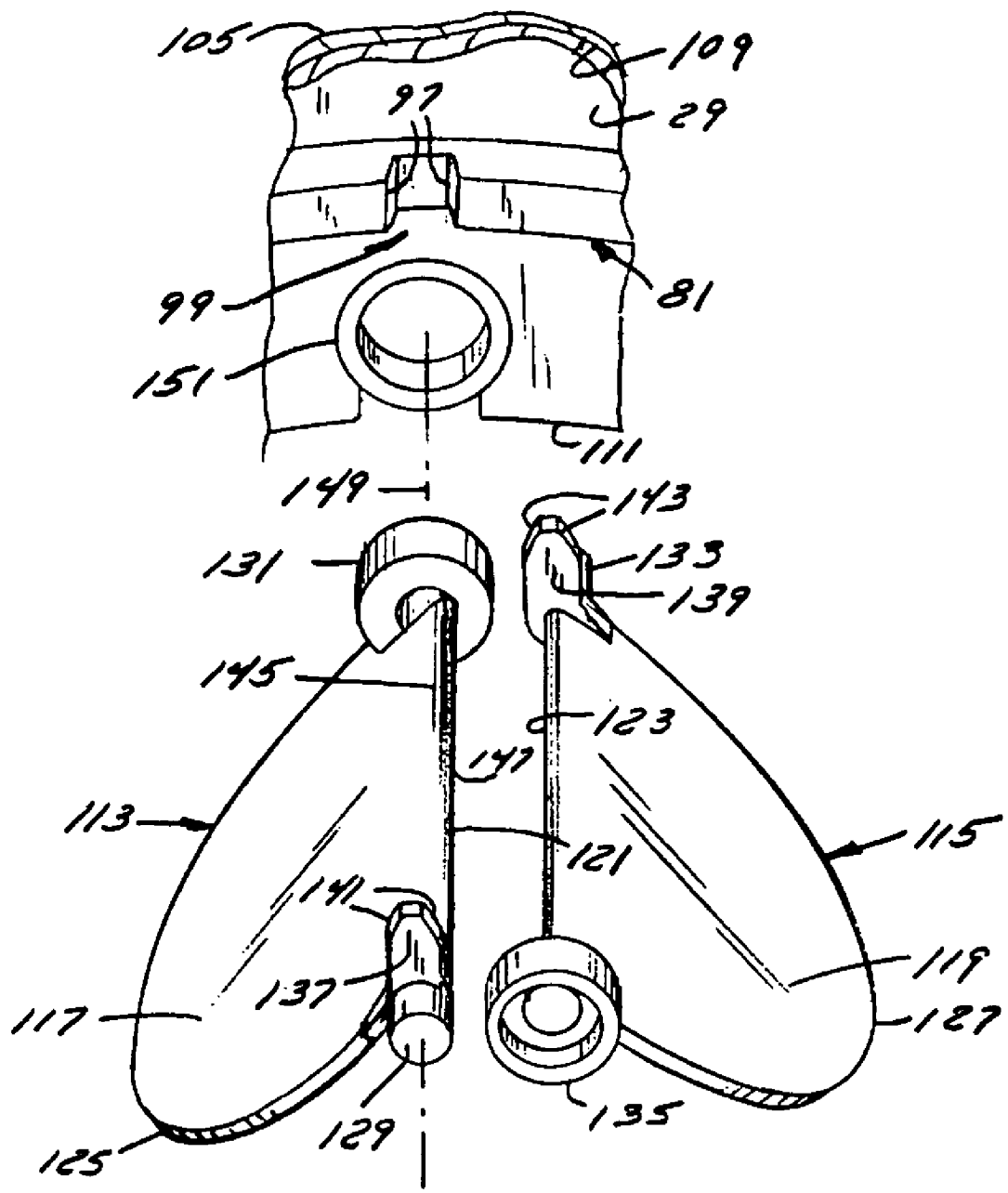
FIG. 10 is a perspective view of an alternative embodiment of the leaves. The leaves are shown in a separated position and portions of the structure shown have been cut away. The activating arms are shown as mounted along the male stub shafts in this embodiment.

As shown in FIGS. 4–6 and 10, stub shafts 129, 131, 133, 135 share a common pivot axis 149 diametrical to the valve support outlet end 111 and such axis 149 is rotated within plane 150 when valve support 105 is rotated back and forth in the directions of dual-headed arrow 189. Stub shaft female ends 131, 135 are journaled in valve support 105 and are each preferably seated in a low-friction bushing 151, 153 secured to valve support 105 in respective diametrically opposed and substantially circular receiving slots, of which slot 155 is exemplary. FIGS. 5 and 6 show that the such slots (i.e., slot 155 and the corresponding slot) need not fully surround bushings 151, 153. As an alternative to the structure of FIGS. 5 and 6, the slots (i.e., slot 155 and the corresponding slot) may fully surround bushings 151, 153 around their circumference. Stub shaft male ends 129, 133 are pivotally located in the respective female end 135, 131 and are preferably seated in a low-friction bushing 159, 161 secured in the respective female end 135, 131. Ultra high molecular weight polyethylene has been found to be particularly well suited as materials for bushings 151, 153, 159, 161.

The preferred embodiment described above acts in a manner which could be characterized as a rack-and-pinion system with the activating arms 137, 139 serving as the pinion and the notches 99, 101 serving as the rack. In an alternative embodiment, the rack and pinion style mechanical coupling may be replaced with other mechanical structure provided to urge the leaves 113, 115 to open when valve support is rotated relative to flow tube; examples include a cam or frictional wheel. It is not necessary that the coaction of the activating arms 137, 139 and notches 99, 101 close the leaves 113, 115 as the leaf-closing function could be performed by other machine structure, such as by a spring.

An actuator assembly 163 is provided to cause relative rotational movement of the flow tube 29 and valve support 105. Rotation to a first relative position causes the flow tube actuation surface 97 and valve actuation surfaces 141, 143 to coact to open leaves 113, 115 (FIG. 9) and rotation to a second relative position causes the leaves 113, 115 to close (FIG. 7).

As shown in FIGS. 5 and 6, actuator assembly 163 includes an actuator mount 165 provided to mount actuator 167 to flow tube 29. Actuator mount 165 includes a bearing support 169 clamped in fixed-position relationship around flow tube outer surface 89 by bearing clamp 171 held in place by bolts 173, 175 positioned therethrough. Valve support actuation ring 177 is joined to valve support 105 along outer surface 107. Actuation arm 178 projects outward from ring 177. Ring 177 is positioned at one end against circular recessed portion 179 of outer lapper 181 joined to bearing clamp 171 by fasteners 183. Bearing 176 is positioned around flow tube between actuation ring 177 and actuator mount 165 formed by bearing support 169 and clamping member 171. Bearing 176 and outer lapper 181 are preferably made of a low-friction material such as polyethylene.

Actuation arm 178 projects through opening 182 recessed in outer lapper 181. Stop surfaces 185, 187 limit the range of motion of arm 178 to about 30 degrees. This arrangement permits bi-directional movement of valve support 105 relative to flow tube 29 in the directions of dual-headed arrow 189.

Actuator 167 is provided to drive arm 178 and valve support 105 back and forth in the directions of arrow 189. Actuator is preferably a bi-directional pneumatic linear actuator. A suitable actuator 167 is a Model B-FT041D stainless steel pneumatic actuator available from Bimba Manufacturing Co. of Monee, Ill. Actuator 167 locating pins 193, 195 are positioned respectively in eyelet 197 and trunnion 199. Actuator piston 201 is joined to arm 178 at joint 203 by linkage 205. Tubular ducts 207, 209 connected to respective actuator fittings 206, 208 direct pressurized air from a pressurized air source (not shown) through an air valve (not shown) in cabinet 255 to the actuator 167 to drive piston 201 back and forth axially in the directions of dual-headed arrow 210. In the example shown, actuator 167 may be any suitable actuator provided to cause relative rotation of flow tube 29 and valve support 105. Other types of actuators may include a solenoid, cam or drive wheel. A spring (not shown) or other apparatus may be used to rotate valve support 105 in conjunction with actuator 167. For instance, actuator 167 may drive valve support 105 in one direction of arrow 189 loading the spring and the spring may rotate the valve support 105 in the opposite direction of arrow 189.

Referring again to FIGS. 1 and 2, VFFS machine 11 further includes packaging apparatus 211 which comprises packager 213, sealer 215 and separator 217 apparatus (FIGS. 1 and 2) provided to load a predetermined amount of bulk material from flow tube 29 into separate packages, of which packages 43a and 43b are exemplary. The packager 213 forms a package from a roll of raw material 219. This material is in the form of a continuous web 221 and may be made of many types of material and material laminates. Exemplary materials include polyvinylchloride film, laminated PET and opaque polyethylene, metalized film, mylar or high-density molecular weight polyethylene.

The roll 219 is advanced by a pre-unwind motor (not shown) which is in contact with the roll 219 and ensures that there is sufficient slack in the packaging apparatus 213 to permit the material 221, in the form of a web, to be fed therethrough. As shown in FIG. 2, this web of material 221 coming off roll 219 is directed through a sequence of tensioning rollers, of which rollers 220a and 220b are exemplary. The web 221 is further fed through a pair of dancing rollers or a "dancer" 223 which maintains a certain portion of the material on the roll 219 under a constant and relatively slight tension. Dancer 223 pivots, moving up and down as shown in FIG. 2 as material 221 is pulled through the system.

The material web 221 on roll 219 continues through the packager 213 toward and around a forming shoulder or collar 227. This shoulder 227 redirects the material 219 such that it forms a tubular-shaped wrapping around forming tube 228 with a small amount of overlap. Forming tube 228 is coaxial with flow tube 29.

The overlap is positioned in front of the VFFS machine 11 and is guided downward underneath a vertically extending hot shoe or sealing tool 229. Electricity provided to hot shoe 229 causes the overlapping portions of the web 221 to melt and seal to each other forming a continuous tube.

The web material 221 is drawn through the packager 213 by a pair of drive belts 231, 233. These belts extend around drive rollers 235, 237, 239 and 241 which press against the now-sealed tube of web material 221. The drive belts 231, 233 are disposed in opposing relationships on opposite sides of the now tubular web 221 and are driven at the same time and speed thereby ensuring that both belts 231, 233 pull the same amount of material 221 through the system 213 at the same rate. To increase the friction between the tubular web 221 and the drive belts 231, 233, a vacuum source (not shown) may be connected to the drive belts 231, 233, and the drive belts may be provided with holes (not shown) through which a vacuum can be pulled. With this arrangement, the pressure of the belts 231, 233 against the formed tube 221 which is then pressed against stationary forming tube 228, can be reduced or eliminated, thus permitting the now tubular web 221 to be pulled more easily. Wire guides 230 may be provided to shape the circular package into a flattened shape to facilitate sealing by the sealer 215.

Drive rollers 235–241 are driven by a drive shaft 243 that, in turn, is driven by a motor 245. Belts 231, 233 pull down the now-tubular web 221, including partially formed package 43. Package 43a is the bottom of the now tubular web material 221 with transverse portion 247 formed as a seal extending across the entire tubular web.

Notably, the compact design of the flow tube 29, valve support 105 and leaves 113, 115 located in valve support 105 permits the use of a forming tube 228 with a diameter only slightly greater than that of valve support 105. This arrangement permits the use of smaller packages 43 and permits the use of an auger 39 which is larger relative to the packages 43 increasing relative throughput and contributing to more efficient VFFS machine 11 operation.

At this point, bulk material falls from flow tube outlet 81 and into package 43a as described below in the section on machine operation.

Next, the sealer apparatus 215 seals each loaded package 43a. This seal is formed by a pair of cross-sealing jaws 248, 249 that face each other and are driven by mechanism 250. As the tubular web 221 descends from the machine driven by belts 231, 233, cross sealing jaws 248, 249 move inward toward one another and seal against a portion of the tubular web 221. Each of the jaws 248, 249 includes an internal heating element (not shown) that causes the tubular web 221 to melt and adhere to itself thereby creating a transverse seal.

Finally, separator apparatus 217 is provided adjacent the cross sealing jaws 249. Separator apparatus 217 comprises a cutter bar 251 mounted adjacent the cross sealing jaws 248, 249 transverse to the descending tubular web 221. This cutter bar 251 severs web 221 to form package 43b once a seal has been formed on the upper end of the package 43b thereby completely enclosing the bulk material in a sealed package 43b having a transverse seal both at the bottom end and at the top end. Completely formed package 43b drops away from the VFFS machine 11. Package 43 is then labeled, printed, or boxed.

Control of the VFFS machine 11 will now be described, particularly with reference to FIGS. 1 and 2. In the example of FIGS. 1 and 2, a separate control system 253 located in cabinet 255 controls operation of the drive assembly 27 powering the auger 39 and valve apparatus 10. Control system 253 controls each dispense cycle including: (1) triggering operation of actuator 167 to cause opening of leaves 113, 115; (2) starting and stopping operation of the drive assembly 27 to rotate auger 39 to dispense a predetermined amount of bulk material through flow tube outlet 81; and (3) triggering operation of actuator 167 to cause the leaves 113, 115 to close once the predetermined amount of bulk material has been dropped into a package 43a. Control system 253 also controls operation of drive assembly 27 to power the optional agitator 45.

A further control system 257 located in cabinet 259 controls operation of the packaging apparatus 211. Control system 257 controls the packaging component of each dispense cycle in a coordinated manner with the filling operation, including control over: (1) operation of the packager 213 to form a package 43 into which the bulk material is loaded; (2) operation of the sealer 215 to seal each package 43 and (3) operation of the separator 217 to separate each loaded, sealed package from the web material 221 all as described herein.

A touch screen video display 261 is preferably provide as an interface between the operator and both control systems 253, 257. Video display 261 presents command options (preferably as GUI icons) to the operator and displays desired information relating to operation of the VFFS machine 11. Devices, other than a touch screen video display, may be used to input and/or receive information relating to operation of the VFFS machine 11. For example, commands may be inputted using a PC, mouse and keyboard (not shown), a local area network, an internet-based system, or any other suitable arrangement.

Control systems 253, 257 are preferably in the form of programmable logic controllers ("PLC") which operate according to a "ladder logic" protocol known to those of skill in the art. While PLC-type controls are highly preferred because of their reliability of operation in a manufacturing environment, it is envisioned that other types of control systems may be used to control operation of the VFFS machine 11. For example, a PC-based or microcontroller-based control system may be adopted for use in controlling operation of VFFS machine 11. Separate control systems 253, 257 are not required as any suitable system permitting control of VFFS machine 11 may be used. Accordingly, control systems 253, 257 may be incorporated into a single control system.

Operation of the bi-leaved valve apparatus 10 in the context of the VFFS machine 11 form of bulk-material metering apparatus will now be described in the context of machine start up and a single dispense cycle. VFFS machine 11 may be adapted to perform in excess of 100 dispense cycles per minute depending on the nature of the bulk material to be dispensed.

Initially, VFFS machine 11 is powered up and is programmed to meter the desired amount of bulk material into the web of packaging material 221 used to form packages, such as bag 43. A web material roll 219 is loaded and the web material 221 is threaded into the packaging apparatus 211.

Bulk material is fed into hopper 41 through cover inlet 79 or directly into hopper inlet 65. If provided, agitator 45 is rotated to agitate bulk material in hopper 41 and to circulate such material toward auger 39 creating room in hopper 41 to receive bulk material through inlet 65.

Packaging system 211 brings the formed tubular packaging material web 221 over the forming tube 228 in position to receive a predetermined amount of bulk material from flow tube outlet 81 as described above.

Leaves 113, 115 are initially in the open position shown in FIG. 9 permitting material flow through flow tube outlet 81 and valve support outlet end 111.

Control system 253 starts auger drive assembly 27 to power auger 39 to move bulk material from feed hopper 41 and into flow tube material passageway 87. Auger 39 is powered by drive assembly 27 for a time increment sufficient to meter the desired amount of bulk material out of outlet 81 and into the package 43a. Auger is stopped at the end of the time increment.

Next, control system 253 triggers a pulse of air to pneumatic actuator 167 to extend piston 201 driving arm 178 to rotate valve support 105 in one direction relative to flow tube 29. Valve support 105 rotates with axis 149 in plane 150 in one of the directions of dual-headed arrow 189. Coaction of cam surfaces 141, 143 and respective notch 99, 101 urges leaves 113, 115 from the open position shown in FIG. 9 through the mid-position shown in FIG. 8 to the closed position of FIG. 7. Advantageously, very little motion of piston 201 and valve support 105 is needed to completely open and close the leaves 113, 115. Closing of leaves 113, 115 positively stops bulk material flow through outlets 81, 111.

Control system 257 then controls packaging system 211 sealer 215 to simultaneously seal the top of package 43b and bottom of the next sequential package 43a. Closure of leaves 113, 115 prevents any "drip" of bulk material onto the portion of package 43a and 43b being sealed thereby potentially interfering with formation of the seal. Separator 217 separates the sealed package 43b from the web of packaging material 221 and the packager 213 advances the formed tubular packaging material web 221 over the forming tube 228 in position to receive a further predetermined amount of bulk material from flow tube outlet 81 as described above.

Finally, control system 253 triggers a second pulse of air to pneumatic actuator 167 to retract piston 201 driving arm 178 in the opposite direction of arrow 189 rotating valve support 105 in the opposite direction relative to flow tube 29. Coaction of cam surfaces 141, 143 and respective notch 99, 101, as valve support 105 rotates, urges leaves 113, 115 from the closed position of FIG. 7, through the mid-position shown in FIG. 8 and back to the open position of FIG. 9. Opening of leaves 113, 115 opens the flow tube outlet 81 and valve support end 111 again permitting bulk material flow and placing the VFFS machine 11 in position to initiate the next dispense cycle.

Alternative structure may be provided for use in connection with the invention. In the preferred embodiment shown, Flow tube 29 is in fixed-position relationship with VFFS machine 11 and valve support 105. In other, less preferred, embodiments, valve support 105 may be in fixed-position relationship and flow tube 29 may be mounted for rotational movement through an appropriate bearing apparatus. While not preferred, leaves 113, 115 may be mounted directly on flow tube 29 and the actuation surface 97 positioned on the valve support 105. Rotation of the flow tube 29 would actuate the leaves 113, 115 to be moved between the opened and closed positions.

Valve support 105 need not be in the form of the elongate tube shown as the best mode of practicing the invention and could have other configurations permitting the relative rotation of flow tube 29 and valve support 105. For example, valve support 105 could be in the form of a collar or ring located proximate flow tube outlet 81.

The bi-leaved valve apparatus 10 may be used with other types of bulk-material metering machines. For example, the invention has utility in bulk material metering machines such as the machine described in commonly-owned U.S. Pat. No. 6,612,347.

The invention provides a number of important advantages. Due to the diametrical axis of rotation of the leaves 113, 115, the hinge lines of the prior art double flapper are obviated. This considerably reduces the internal diameter of the forming tube 238. This change ultimately increases the flow area by allowing the use of a larger flow tube 29 and auger 39 for the same size forming tube 238, which directly correlates to increased flow area and throughput of product.

The valve apparatus 10 provides improved control over bulk material flow because the flow of bulk material can be positively stopped making it possible to accurately meter the bulk material into the packages and avoid "drip" of bulk material. The design of the valve apparatus 10 is robust and may utilize few parts thereby making the apparatus easy to manufacture and use and ensuring reliable operation.

From the foregoing description taken with the accompanying drawings it will be apparent that this invention provides a manner for dispensing bulk material into individual flexible packages in conjunction with a number of other filling and bagging machinery. In addition, the cut-off device of this invention, notwithstanding its simplicity and ease of manufacture, also has other uses in connection with regulating the flow of matter.

It is believed that the invention has been described in such detail as to enable those skilled in the art to understand the same and it will be appreciated that variations may be made without departing from the spirit and scope of the invention.

I claim:

1. A bi-leaved valve apparatus comprising:
   a substantially cylindrical flow tube defining an axial material passageway, an outlet and a flow tube actuation surface;
   a valve support mounted about the flow tube adjacent the flow tube outlet, said valve support and flow tube being relatively rotatable;
   a pair of leaves attached to the valve support and sized to seal the flow tube outlet, said leaves being movable between open and closed orientations and having a valve actuation surface adjacent the flow tube actuation surface; and
   an actuator causing relative rotational movement of the flow tube and valve support such that rotation to a first relative position causes the flow tube and valve actuation surfaces to open the leaves and rotation to a second relative position causes the leaves to close.

2. The bi-leaved valve apparatus of claim 1 wherein:
   the flow tube actuation surface comprises a pair of notches integral with the flow tube;
   The valve actuation surface comprises an activating arm projecting from each leaf into a respective notch; and
   coaction of the notch and activating arm moves a respective leaf during the relative rotation between the positions.

3. The bi-leaved valve apparatus of claim 1 wherein the flow tube is stationary and the valve support rotates relative to the flow tube.

4. The bi-leaved valve apparatus of claim 3 wherein the valve support is mounted for bi-directional rotational movement between the positions.

5. The bi-leaved valve apparatus of claim 1 wherein the valve support defines a valve support opening having a substantially circular cross section transverse to the axial material passageway and the leaves are diametrically connected to the valve support across the valve support opening along a common axis.

6. The bi-leaved valve apparatus of claim 5 wherein each leaf includes a straight edge and an intersecting arcing edge defining a maximum distance from the straight edge and the leaves form a substantially circular surface across the valve support opening when in the closed position.

7. The bi-leaved valve apparatus of claim 6 wherein the leaves partially overlap adjacent the straight edges.

8. The bi-leaved valve apparatus of claim 7 wherein one leaf is an outer leaf, the other leaf is an inner leaf and the straight edge of the outer leaf is in contact with an inner leaf outer surface as the leaves are moved between the open and closed positions.

9. The bi-leaved valve apparatus of claim 6 wherein each leaf includes a pair of axially-aligned stub shafts journaled with respect to the valve support along the common axis.

10. The bi-leaved valve apparatus of claim 9 wherein one of each pair of axially-aligned stub shafts has a female end journaled directly in the valve support and the other of each pair of axially-aligned stub shafts has a male end journaled in the female end.

11. The bi-leaved valve apparatus of claim 1 wherein the actuator comprises:
    an actuator mount;
    a linear actuator having a body affixed to the actuator mount and a piston;
    a linkage connecting the piston and valve support such that movement of the piston rotates the valve support relative to the flow tube; and
    a controller operatively controlling operation of the linear actuator.

12. The bi-leaved valve apparatus of claim 11 wherein the linear actuator is a pneumatic actuator.

13. The bi-leaved valve apparatus of claim 11 wherein the linear actuator provides bi-directional movement to the piston.

14. A bi-leaved valve apparatus comprising:
    a stationary substantially cylindrical flow tube defining an axial material passageway, a flow tube outlet and at least one flow tube actuation surface;
    a substantially cylindrical valve support mounted concentrically about the flow tube adjacent the flow tube outlet, said valve support being rotatable relative to the flow tube;
    a pair of leaves pivotally connected to the valve support across the flow tube outlet along a common axis transverse to the axial material passageway, each leaf including an actuation surface positionable against the flow tube actuation surface; and
    an actuator in power-transmission relationship with the valve support, said actuator rotating the valve support relative to the flow tube such that, in one relative position, coaction of the flow tube and valve actuation surfaces urge the leaves to an open position and, in a second position, coaction of the flow tube and valve actuation surfaces urge the leaves to a closed position sealing the flow tube outlet.

15. The bi-leaved valve apparatus of claim 14 wherein the flow tube actuation surface comprises a pair of notches integral with the flow tube outlet.

16. The bi-leaved valve apparatus of claim 14 wherein the valve support is mounted for bi-directional rotational movement between the positions.

17. The bi-leaved valve apparatus of claim 14 wherein each leaf includes a straight edge and an intersecting arcing edge and the leaves form a circular surface across a valve support opening when in the closed position.

18. The bi-leaved valve apparatus of claim 17 wherein the leaves partially overlap adjacent the straight edges.

19. The bi-leaved valve apparatus of claim 18 wherein one leaf is an outer leaf, the other leaf is an inner leaf and the straight edge of the outer leaf is in contact with an inner leaf outer surface as the leaves are moved between the open and closed positions.

20. The bi-leaved valve apparatus of claim 14 wherein each leaf includes a pair of axially-aligned stub shafts journaled with respect to the valve support along the common axis diametrical to the valve support opening.

21. The bi-leaved valve apparatus of claim 14 wherein the actuator comprises:
    an actuator mount;
    a bi-directional linear actuator having a body affixed to the actuator mount and a piston powered in first and second directions;
    a linkage connecting the piston and valve support such that movement of the piston rotates the valve support; and
    a controller operatively controlling activation of the bi-directional linear actuator.

22. A bulk material metering apparatus comprising:
    a support structure;
    a feed hopper mounted with respect to the support structure;

a substantially cylindrical flow tube mounted with respect to the support structure, said flow tube defining an axial material passageway, an upper inlet in material-feed relationship with the feed hopper, a lower outlet and a flow tube actuation surface;

a substantially cylindrical valve support mounted about the flow tube adjacent the flow tube outlet, said valve support and flow tube being rotatable relative to the other;

a pair of leaves pivotally connected to the valve support across the flow tube outlet along a single axis transverse to the axial material passageway, each leaf having a valve actuation surface positionable along the flow tube actuation surface;

an actuator causing relative rotational movement of the flow tube and valve support such that rotation to a first relative position causes the actuation surfaces to open the leaves and rotation to a second relative position causes the leaves to close; and a controller operatively controlling the actuator.

23. The bulk material metering apparatus of claim 22 further comprising vertical form/fill/seal apparatus for packaging predetermined amounts of bulk material including:

a packager mounted with respect to the support structure including machine structure adapted to position an open end of a tube-shaped packaging material web in material-feed relationship with the flow tube outlet;

a sealer mounted with respect to the support structure including machine structure adapted to form the packaging material web into separate sealed packages containing the bulk material; and a separator mounted with respect to the support structure including machine structure adapted to separate the sealed packages from the packaging material web.

24. The bulk material metering apparatus of claim 22 wherein:

the flow tube actuation surface comprises a pair of notches integral with the flow tube;

the valve actuation surface comprises an activating arm projecting into a respective notch; and coaction of the notch and activating arm moves a respective leaf during relative rotation between the positions.

25. The bulk material metering apparatus of claim 22 wherein the flow tube is stationary and the valve support rotates relative to the flow tube.

26. The bulk material metering apparatus of claim 25 wherein the valve support is mounted for bi-directional rotational movement between the positions.

27. The bulk material metering apparatus of claim 22 wherein the valve support defines a valve support opening having a substantially circular cross section transverse to the axial material passageway and the single axis is a valve support opening diameter.

28. The bulk material metering apparatus of claim 27 wherein each leaf includes a straight edge and an intersecting arcing edge defining a maximum distance from the straight edge and the leaves form a circular surface across the valve support opening when in the closed position.

29. The bulk material metering apparatus of claim 28 wherein the leaves partially overlap adjacent the straight edges when in the closed position.

30. The bi-leaved valve apparatus of claim 29 wherein one leaf is an outer leaf, the other leaf is an inner leaf and the straight edge of the outer leaf is in contact with an inner leaf outer surface as the leaves are moved between the open and closed positions.

31. The bulk material metering apparatus of claim 29 wherein each leaf includes a pair of axially-aligned stub shafts journaled with respect to the valve support along the single axis.

32. The bulk material metering apparatus of claim 31 wherein one of each pair of axially-aligned stub shafts has a female end journaled directly in the valve support and the other of each pair of axially-aligned stub shafts has a male end journaled in the female end.

33. The bulk material metering apparatus of claim 22 wherein the actuator comprises:

an actuator mount;

a linear actuator having a body affixed to the actuator mount and a piston; and a linkage connecting the piston and valve support such that movement of the piston rotates the valve support relative to the flow tube.

34. The bulk material metering apparatus of claim 33 wherein the linear actuator is a pneumatic actuator.

35. The bulk material metering apparatus of claim 33 wherein the linear actuator provides bi-directional movement to the piston.

* * * * *